United States Patent
Nguyen

(10) Patent No.: US 9,354,945 B2
(45) Date of Patent: May 31, 2016

(54) MANAGING A LOCK TO A RESOURCE SHARED AMONG A PLURALITY OF PROCESSORS

(71) Applicant: International Business Machines Corporation, Armonk, NY (US)

(72) Inventor: Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 826 days.

(21) Appl. No.: 13/650,790

(22) Filed: Oct. 12, 2012

(65) Prior Publication Data

US 2014/0108728 A1 Apr. 17, 2014

(51) Int. Cl.
G06F 12/00 (2006.01)
G06F 9/52 (2006.01)

(52) U.S. Cl.
CPC ..................... G06F 9/526 (2013.01)

(58) Field of Classification Search
CPC ..................................... G06F 9/526
See application file for complete search history.

(56) References Cited

U.S. PATENT DOCUMENTS

| | | | |
|---|---|---|---|
| 5,790,851 A * | 8/1998 | Frank et al. ............... 718/104 |
| 6,779,090 B2 | 8/2004 | McKenney et al. |
| 6,792,497 B1 | 9/2004 | Gold et al. |
| 2003/0200457 A1 | 10/2003 | Auslander et al. |

OTHER PUBLICATIONS

Magnusson et al., Queue Locks on Cache Coherent Multiprocessors, Proceedings on 8th International Symposium on Parallel Processing, pp. 165-171, 1994.
Mellor-Crummey et al., Algorithms for Scalable Synchronization on Shared-Memory Multiprocessors, ACM Transactions on Computer Systems, vol. 9, No. 1, pp. 21-65, Feb. 1991.

* cited by examiner

Primary Examiner — Kalpit Parikh
(74) Attorney, Agent, or Firm — David W. Victor; Konrad Raynes Davda & Victor LLP

(57) ABSTRACT

Provided are a computer program product, system, and method for managing a lock to a resource shared among a plurality of processors. Slots in a memory implement the lock on the shared resource. The slots correspond to counter values that are consecutively numbered and indicate one of busy and free. A requesting processor fetches a counter value comprising a fetched counter value. A determination is made as to whether the slot corresponding to the fetched counter value indicates free. A processor identifier of the requesting processor is inserted into the slot corresponding to the fetched counter value in response to determining that the slot corresponding to the fetched counter value indicates not free. The requesting processor accesses the shared resource in response to determining that the slot corresponding to the fetched counter value indicates free.

27 Claims, 5 Drawing Sheets

MANAGING A LOCK TO A RESOURCE SHARED AMONG A PLURALITY OF PROCESSORS

BACKGROUND OF THE INVENTION

1. Field of the Invention

The present invention relates to a computer program product, system, and method for managing a lock to a resource shared among a plurality of processors.

2. Description of the Related Art

Locks are used in shared memory parallel programs executed in a multi-processor environment to provide mutual exclusivity for non-parallelized sections of the code that may be executed by only one processor at a time. One prior art lock is a spin lock, such as a Test and Set lock. A first user that acquires the lock can access the non-parallelized code and other processes must continually check, i.e., spin, the lock to determine when the lock is available. The first processor that checks after the lock becomes available may take the lock even if other processors have been waiting a longer time.

Another type of lock is an array based queue lock algorithm. Each lock requires a counter and spin locations, or cache line, for each processor. The counter values provide addresses to the slots. Upon initialization of the lock, the spin locations, also known as slots, are set to busy, except the first location, slot 0, is set free, and a counter having values corresponding to the slots is set to 0. The first processor seeking the lock performs an atomic fetch_and_increment operation on the counter to access the counter value and then increment the counter value. The fetched counter value provides the address or number of the slot that the processor is to access, or spin on.

The requesting processor checks the counter having the zero value and accesses the first slot, corresponding to the zero counter value. If the slot is free, then the processor has acquired the lock and will then set the slot to busy, for the next use of the slot. If the slot is not free, then the requesting processor spins on that slot until it is free. When a processor releases a lock, the next slot is set to free.

This array based queue lock uses one cache line for each slot so that each processor may spin on that slot until the slot is set to free. This technique may require significant memory resources as the number of locks increases, because for each lock, a cache line is required for each slot, or the number of processors.

There is a need in the art for improved techniques for managing locks to shared resources.

SUMMARY

Provided are a computer program product, system, and method for managing a lock to a resource shared among a plurality of processors. Slots in a memory implement the lock on the shared resource. The slots correspond to counter values that are consecutively numbered and indicate one of busy and free. A requesting processor fetches a counter value comprising a fetched counter value. A determination is made as to whether the slot corresponding to the fetched counter value indicates free. A processor identifier of the requesting processor is inserted into the slot corresponding to the fetched counter value in response to determining that the slot corresponding to the fetched counter value indicates not free. The requesting processor accesses the shared resource in response to determining that the slot corresponding to the fetched counter value indicates free.

DETAILED DESCRIPTION

Described embodiments provide techniques for managing a lock to a shared resource, such as non-parallelized code capable of being executed by multiple processors in a multi-processing environment. The lock provides a plurality of slots that are at any time either all busy or only one of the slots indicates free. If a processor requests a lock and finds the slot following the previously accessed slot busy, then the processor inserts its identifier so it may be notified when the lock is free. While waiting for the lock, the requesting processor spins on a spin location for that processor until the lock is freed. By providing separate spin locations from the slots for the processors, multiple slots for the lock may be implemented in a single cache line to conserve memory resources because the processors spin on their spin locations while waiting for the lock, instead of the slot.

Figure 1:
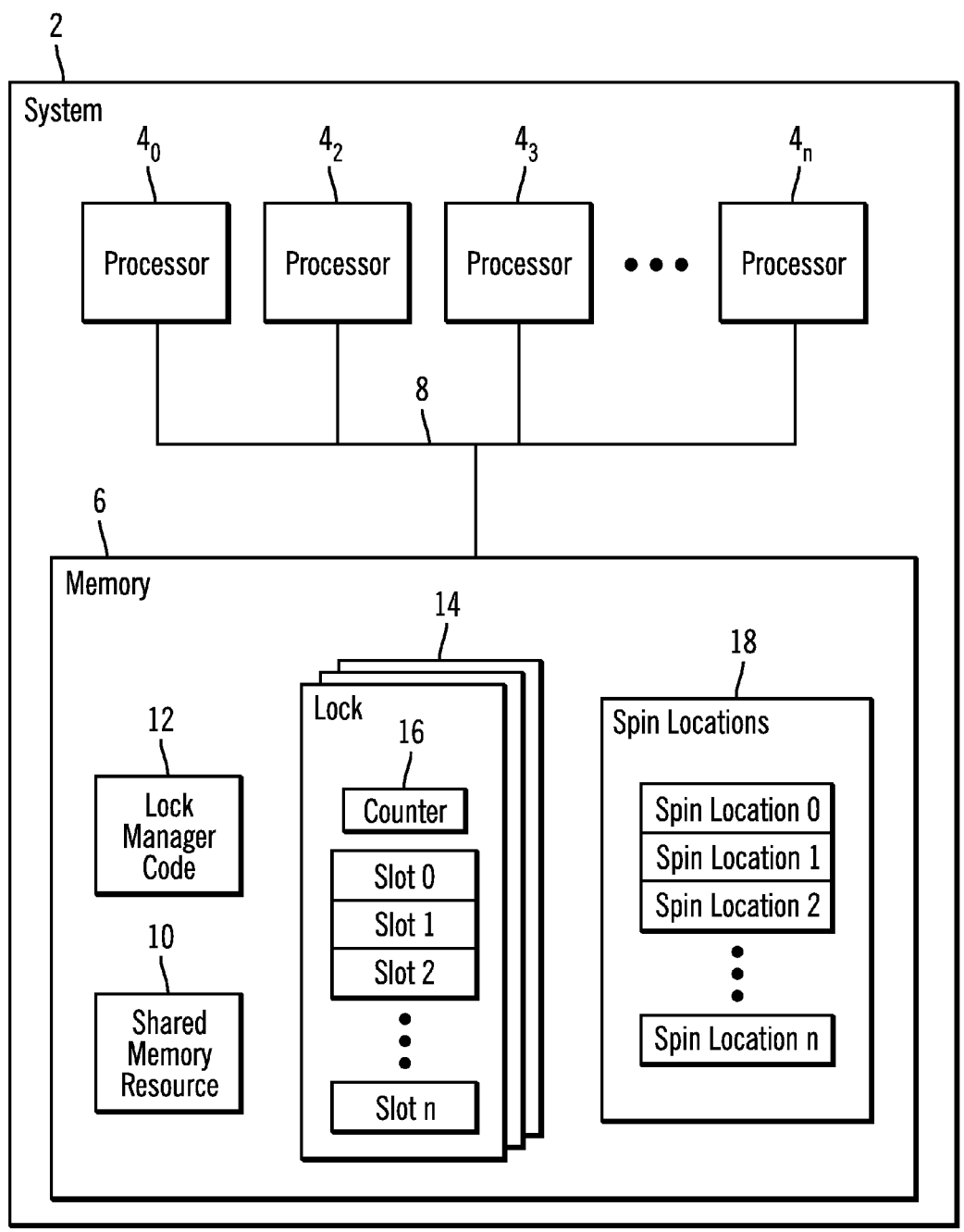
FIG. 1 illustrates an embodiment of a computing environment.

FIG. 1 illustrates an embodiment of a system 2 having a plurality of processors $4_0 \ldots 4_n$ coupled to a shared memory 6 over a bus 8. The processors $4_0 \ldots 4_n$ may execute a shared memory resource 10, which may comprise data structures, parameters, and code. In certain embodiments, the shared memory resource 10 may include parallelized code the processors $4_0 \ldots 4_n$ may execute in parallel and non-parallelized code that can only be executed by one processor $4_0 \ldots 4_n$ at a time. The lock manager 12 includes code that is executed by the processors $4_0 \ldots 4_n$ to manage locks, such as spin locks, that must be held to access the shared memory resources 10.

The memory 6 includes data structures for one or more locks 14, including a plurality of slots 0 . . . n and a counter 16. The counter 16 may have values that correspond to the slots 0 . . . n. In one embodiment, if there are 0 . . . n slots, then there would be counter values 0 . . . n. Each slot indicates either that the lock is busy, a processor identifier of the processor $4_0 \ldots 4_n$ waiting for the lock or free. In one embodiment, there are a same number of slots and processors, e.g., n+1, so that each processor $4_0 \ldots 4_n$ may have a separate slot 0 . . . n to access the lock 14 for the shared resource.

The memory 6 further includes spin locations 18 for the processors $4_0 \ldots 4_n$, where there is one spin location 0 . . . n for each of the n+1 processors $4_0 \ldots 4_n$. If a processor $4_0 \ldots 4_n$ tries to access the lock 14 when the lock is not free, then the processor $4_0 \ldots 4_n$ spins, or continually checks whether the spin location 0 . . . n for the processor $4_0$-$4_n$ indicates free, meaning that the processor $4_0 \ldots 4_n$ may access the lock and the shared resource.

In one embodiment, there is one cache line for each spin location 0 . . . n. Further, in one embodiment, multiple of the slots 0 . . . n may be implemented in a cache line. For instance, if a cache line is 64 bytes and each slot is 4 bytes, then there may be sixteen of the slots 0 . . . n implemented in each cache line. By implementing multiple slots 0 . . . n in a cache line, the described embodiments conserve memory 6 resources, which can be significant when there are multiple locks, each having slots 0 . . . n.

In one embodiment, the processors $4_0$ . . . $4_n$ may comprise separate central processing units (CPUs) or microprocessor units. In an alternative embodiment some or all of the processors $4_0$ . . . $4_n$ may comprises cores on a single CPU. In one embodiment, all the processors $4_0$ . . . $4_n$ are in the same system 2. In an alternative embodiment, the processors $4_0$ . . . $4_n$ may be in remote systems and communicate over a network.

The shared memory 6 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The bus 8 may comprise a bus or data transfer system known in the art, such as a Peripheral Component Interconnect (PCI) type bus.

In one embodiment, the shared memory resource 10 may comprise data structures, values and/or code the processors $4_0$ . . . $4_n$ want to execute. In an alternative embodiment, the shared memory resource 10 may comprise a device or hardware component in the system 2 the processors $4_0$ . . . $4_n$ may want to access. Alternatively, the share memory resource may be in an external system to one or more of the processors $4_0$ . . . $4_n$. Further, a shared memory device may be within the system 2, directly coupled to the system 2 or remote with respect to the system 2.

Figure 2:
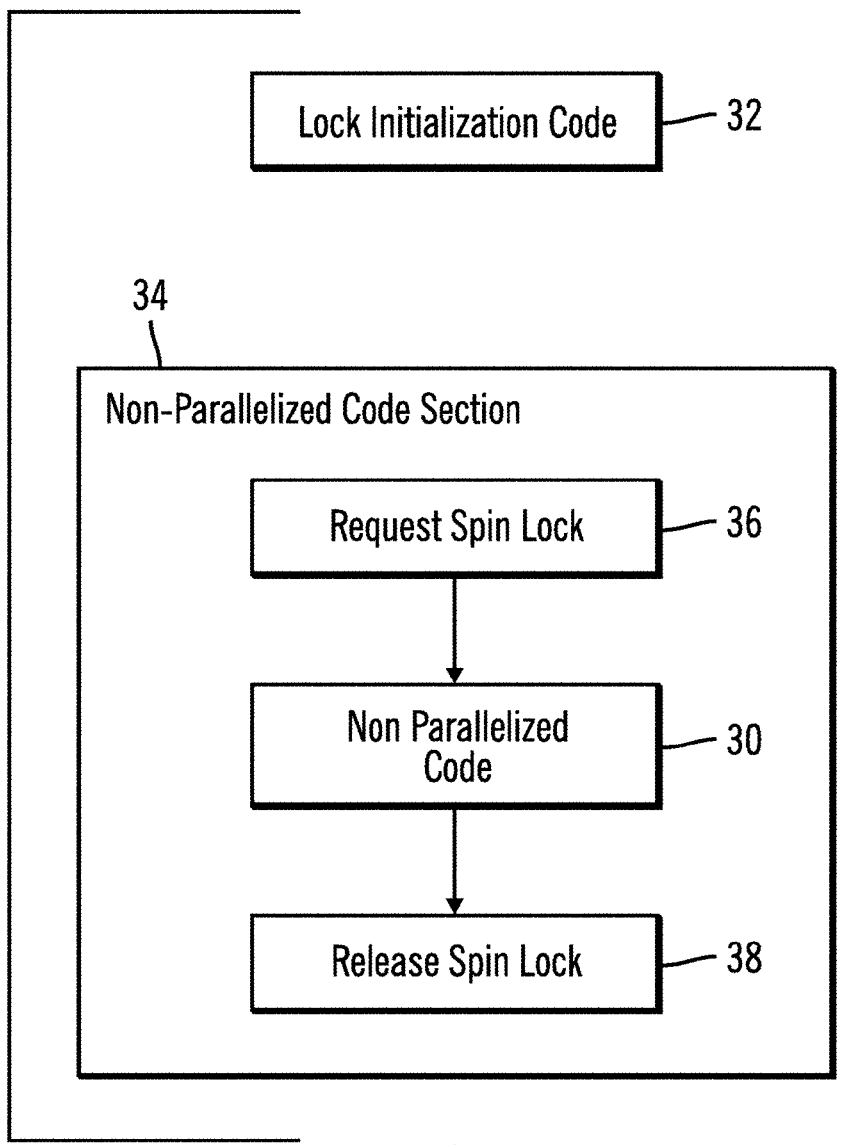
FIG. 2 illustrates an embodiment of lock initialized code and a non-parallelized code section.

FIG. 2 illustrates an embodiment where the shared memory resource 10 comprises non-parallelized code 30 that may only be executed by one of the processors $4_0$ . . . $4_n$ at a time. One or more of the processors $4_0$ . . . $A_n$ execute lock initialization code 32 to initialize the slots 0 . . . n for a lock 14 and to initialize the spin locations 0 . . . n for the processors $4_0$ . . . $4_n$. A non-parallelized code section 34 includes the lock management operations request spin lock 36 and release spin lock 38 as well as the non-parallelized code 30 to execute. The requesting processor $4_0$ . . . $4_n$ executes the request spin lock routine 36 until it obtains the lock 14 for the non-parallelized code 30. After executing the non-parallelized code 30, the executing processor $4_0$ . . . $4_n$ holding the lock 14 executes a release spin lock routine 38 to release the lock 14 on the non-parallelized code 30 to make available for another processor $4_0$ . . . $4_n$ to execute the code 30. In one embodiment, there may be a separate lock 14 for each section of non-parallelized code 30, where different sections of non-parallelized code 30 may be separately executed. Although only one processor $4_0$ . . . $4_n$ at a time may execute a particular non-parallelized code 30 section.

Figure 3:
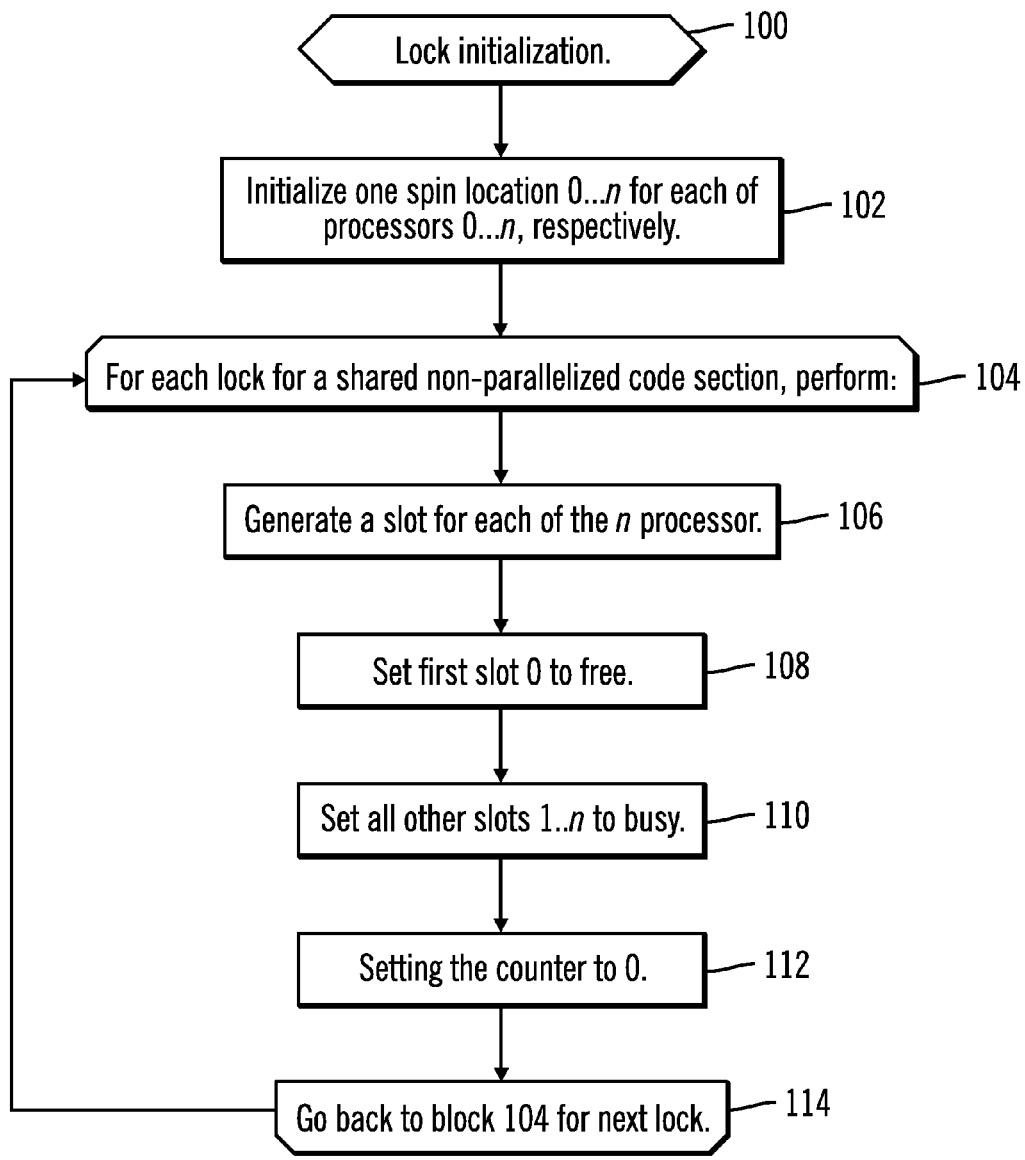
FIG. 3 illustrates an embodiment of operations to initialize lock related data structures.

FIG. 3 illustrates an embodiment of operations performed by the lock manager 12, which is executed by one or more of the processors $4_0$ . . . $4_n$, to perform the operations of the lock initialization code 32. Upon initiating (at block 100) operations for initializing data structures and parameters for managing locks, at least one of the processor $4_0$ . . . $4_n$ initializes (at block 102) one spin location 0 . . . n for each of processors $4_0$ . . . $4_n$, respectively. This operation may be performed during processor initialization before any locks are created or may be created when creating a first lock. For each lock for a shared non-parallelized section 34, at least one of the processor $4_0$ . . . $4_n$ performs a loop (blocks 104-114) of the operations at blocks 106 through 112. At block 106, the lock manager 12 generates a slot 0 . . . n for each of the processors $4_0$ . . . $4_n$, respectively. The first slot 0 is set (at block 108) to free and all the other slots 1 . . . n are set (at block 110) to a busy value. The counter 16 is set (at block 112) to 0, corresponding to slot 0.

After the operations of FIG. 3, the spin location 18 and the lock 14 data structure are generated and ready to be used for lock requests from the processors $4_0$ . . . $4_n$ to access the non-parallelized code 30.

Figure 4:
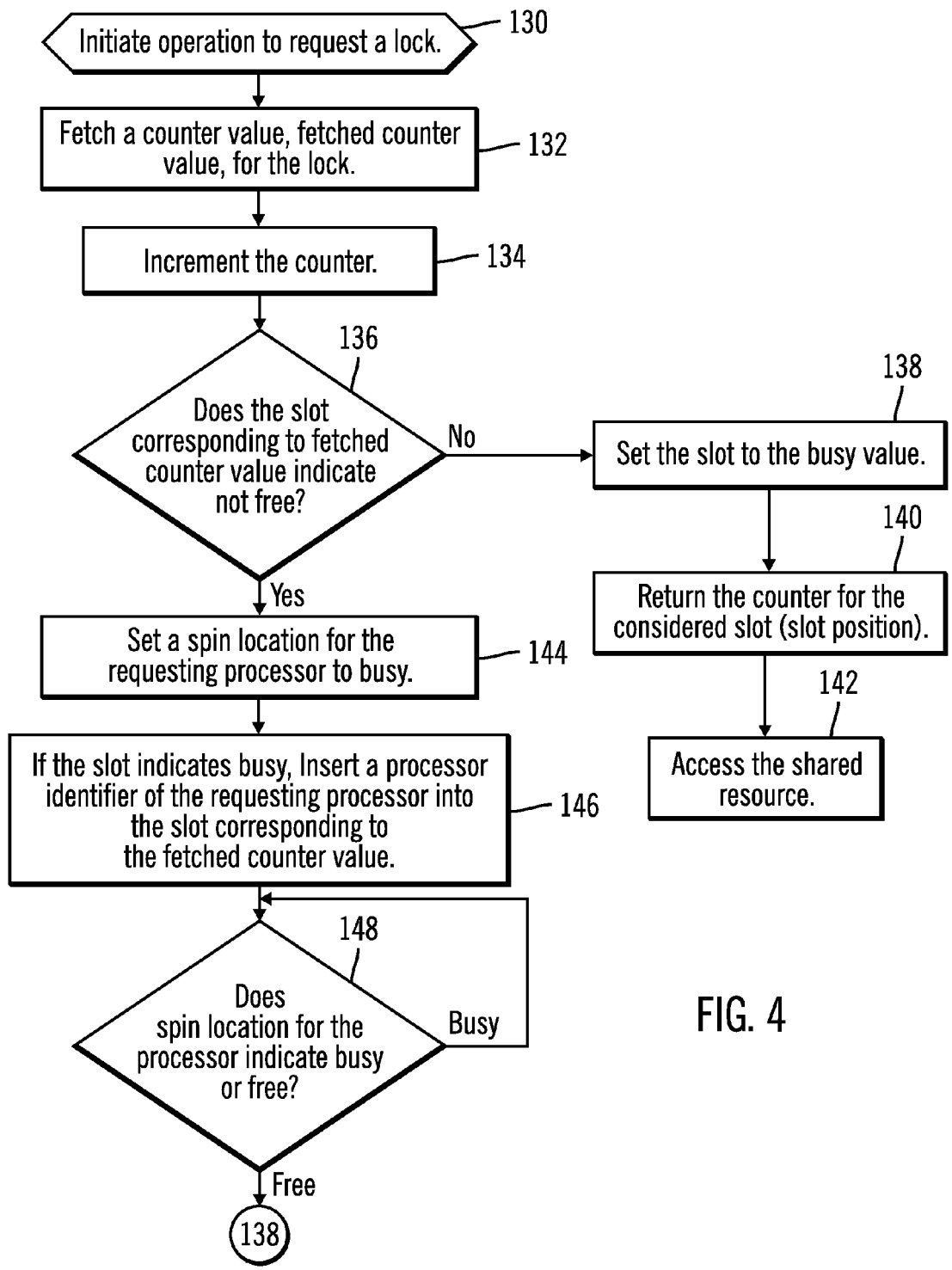
FIG. 4 illustrates an embodiment of operations to request a lock.

FIG. 4 illustrates an embodiment of operations performed by one of the processors $4_0$ . . . $4_n$, referred to as a requesting processor, executing the request spin lock routine 36 to access a lock to be able to access the shared resource, e.g., the non-parallelized code 30. Upon initiating (at block 130) the operation to request a lock, the requesting processor determines (at block 132) a fetched counter value of the counter 16 for the lock 14 being requested and increments (at block 134) the counter. These operations at blocks 132 and 134 of determining the counter value and incrementing the counter may be performed as part of a single atomic fetch_and_increment operation. If (at block 136) the slot i corresponding to the fetched counter value i indicates free, then the requesting processor sets (at block 138) the slot i to the busy value and returns (at block 140) the counter value i for the considered slot i, also known as the slot position. At this point, the requesting processor acquires (at block 142) the lock to the shared resource 10.

If (at block 136) the slot i indicates that the lock 14 is the busy value, i.e., does not include a processor identifier, then the requesting processor sets (at block 144) a spin location j of the spin location 0 . . . n of the requesting processor j to busy. If the slot i indicates busy, then the requesting processor j inserts (at block 146) a processor identifier of the requesting processor into the slot i corresponding to the counter value i. In one embodiment, the operation at block 146 may comprise the atomic compare and swap command. The requesting processor j continually checks (at block 148), e.g., spins on, its spin location j to determine whether the spin location j indicates busy or free. If (at block 148) the spin location j indicates busy, then the requesting processor j continues to spin and check the spin location j. If (at block 148) the spin location j indicates free, then control proceeds at block 138 to perform the operations to acquire the lock and the shared resource, e.g., execute the non-parallelized code.

The integer values i and j may each comprise any integer value and may be the same or different values within the range of values 0 . . . n.

In certain of the described embodiments, the requesting processor spins on its own spin location, which may comprise a cache line. In this way, multiple of the slots 0 . . . n may be implemented in a single cache line because the processors are not spinning on the slots 0 . . . n.

Figure 5:
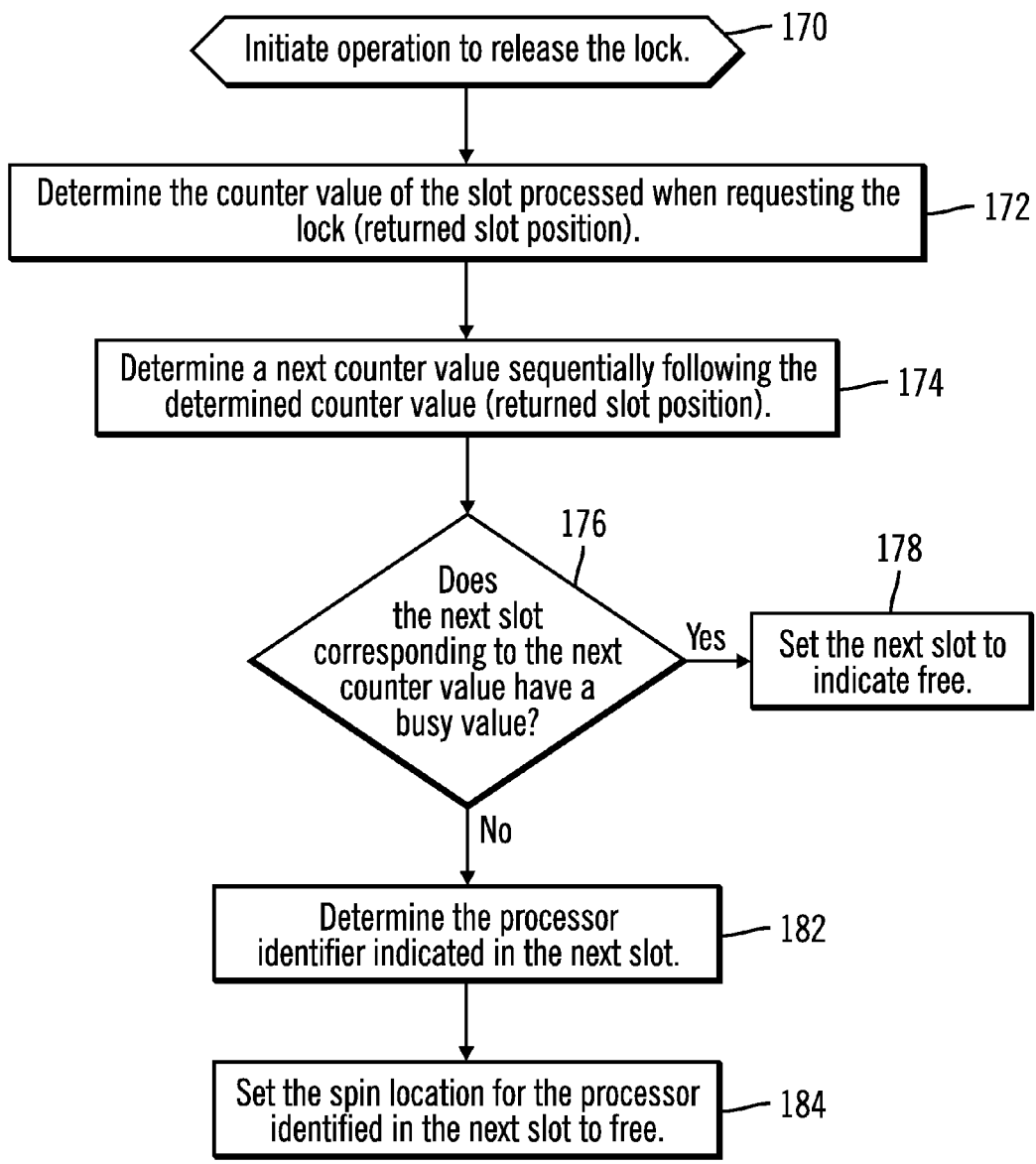
FIG. 5 illustrates an embodiment of operations to release a lock.

FIG. 5 illustrates an embodiment of operations performed by one of the processors $4_0$ . . . $4_n$, referred to as the holding processor, executing the release spin lock 38 routine when completing execution of the non-parallelized code 30 to release the lock 14 to allow other processors $4_0$ . . . $4_n$ access. Upon initiating (at block 170) the operation to release the lock, e.g., execute the release spin lock 38 routine, the holding processor determines (at block 172) the counter 16 value of the slot, e.g., slot i, processed when requesting the lock (returned slot position). The holding processor, determines (at block 174) a next counter value, e.g., i+1, sequentially following the determined counter value i, corresponding to the slot i previously accessed by the holding processor to obtain the lock. If (at block 176) the next slot (i+1) corresponding to the next counter value (i+1) has a busy value 176, then the holding processor sets (at block 178) the next slot to indicate free. Having the busy value means that there is no waiting processor that included its processor identifier in the slot 0 . . . n when unsuccessfully requesting the lock. In one embodiment, the operations at blocks 176 and 178 to compare the next slot (i+1) to determine whether it does not have the busy value and, if so, swap in the free value into the slot may be performed by the compare-and-swap operation. The value you get back from the compare and swap if the swap did not occur, i.e., the next slot is not the busy value, is the next processor ID (at block 182).

If (at block 176) the next slot (i+1) does not have a busy value, which means the next slot includes a processor identifier, then the holding processor determines (at block 182) the processor identifier indicated in the fetched next slot (i+1). The holding processor then notifies the identified processor $4_0 \ldots 4_n$ having the processor identifier that the lock is free. In one embodiment, this notification is performed by setting (at block 182) the spin location 0 . . . n for the identified processor to free to cause the identified processor checking its spin location 0 . . . n to take the lock 14 and access the non-parallelized code 30. When determining that the spin location indicates free, the requesting processor may perform the operations in FIG. 4.

Described embodiments provide techniques for managing a lock to a shared resource, such as shared code and data in memory that may not be concurrently accessed, by maintaining a slot and spin location for each processor capable of accessing the shared resource. In this way, if the lock 14 is not free, then the slot accessed by a requesting processor is set to indicate the identifier of the requesting processor. In certain described embodiments, multiple slots for a lock may be implemented in a cache line because separate spin locations are used for the processors to determine when access to the lock/shared resource is permitted.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a lock for a shared resource accessed by a plurality of processors in communication with a memory, wherein the computer program product comprising a non-transitory computer readable storage medium having computer readable program code embodied therein that executes to cause operations, the operations comprising:

maintaining slots in the memory to implement the lock on the shared resource, wherein the slots correspond to counter values that are consecutively numbered and indicate one of busy and free;

fetching, by a requesting processor comprising one of the processors requesting the lock for the shared resource, a counter value comprising a fetched counter value;

determining whether the slot corresponding to the fetched counter value indicates free;

inserting a processor identifier of the requesting processor into the slot corresponding to the fetched counter value in response to determining that the slot corresponding to the fetched counter value indicates not free; and accessing, by the requesting processor, the shared resource in response to determining that the slot corresponding to the fetched counter value indicates free.

2. The computer program product of claim 1, wherein either all of the slots indicate not free or only one of the slots indicates free.

3. The computer program product of claim 1, wherein the operations further comprise:

performing an atomic operation to perform the fetching of the counter value and incrementing the counter in response to determining the fetch counter value.

4. The computer program product of claim 1, wherein the operations further comprise:

setting a spin location in the memory for the requesting processor to busy;

continually checking, by the requesting processor, the spin location for the requesting processor while the spin location indicates busy; and accessing, by the requesting processor, the shared resource in response to determining that the spin location for the requesting processor indicates free.

5. The computer program product of claim 4, wherein the operations further comprise:

setting the slot corresponding to the fetched counter value to a busy value in response to determining that the slot indicates free; and setting the slot corresponding to the fetched counter value to a busy value in response to determining that the spin location for the requesting processor indicates free, wherein the slot indicates that the shared resource is not free if the slot indicates the busy value or one of the processor identifiers.

6. The computer program product of claim 4, wherein there is one separate spin location for each of the processors and wherein there is a same number of slots, spin locations and processors.

7. The computer program product of claim 4, wherein each spin location comprises one cache line and wherein a plurality of slot cache lines are used to implement the slots, such that multiple slots are implemented in each of the slot cache lines.

8. The computer program product of claim 1, wherein the operations further comprise:

determining, by a holding processor, comprising one of the processors, to release the shared resource;

determining, by the holding processor, a next counter value sequentially following the counter value of the slot the holding processor processed when requesting the lock;

determining, by the holding processor, whether a next slot, comprising the slot corresponding to the next counter value, has a busy value;

determining a next processor identifier indicated in the next slot in response to determining that the next slot does not have the busy value; and notifying a next processor comprising one of the processors identified by the next processor identifier that the lock is free.

9. The computer program product of claim 8, wherein the operations of determining whether the next slot has the busy value and inserting the processor identifier comprise an atomic compare and swap operation.

10. The computer program product of claim 8, wherein the notifying the next processor comprises setting a spin location for the next processor to free, wherein the operations further comprise:

continually determining, by the next processor, whether the spin location for the next processor is free until determining that the spin location is free; and accessing, by the next processor, the shared resource in response to determining that the spin location is free.

11. The computer program product of claim 8, wherein the operations further comprise:

setting, by the holding processor, the next slot to free in response to determining that the next slot indicates the busy value.

12. The computer program product of claim 1, wherein the operations initialize the slots for the lock by performing:

setting a first slot corresponding to a first counter value to free;

setting the slots other than the first slot to busy; and setting the counter to the first counter value, wherein there is a different counter value corresponding to each of the slots.

13. The computer program product of claim 1 where the shared resource comprises non-parallelized share code in the memory accessible to the processors that cannot be concurrently executed by multiple processors.

14. A system, comprising:

a plurality of processors;

a memory accessed by the plurality of processors; and a computer readable storage medium having computer program code executed by at least one of the processors to perform operations, the operations comprising:

maintaining slots in the memory to implement a lock on a shared resource, wherein the slots correspond to counter values that are consecutively numbered and indicate one of busy and free;

fetching, by a requesting processor comprising one of the processors requesting the lock for the shared resource, a counter value comprising a fetched counter value;

determining whether the slot corresponding to the fetched counter value indicates free;

inserting a processor identifier of the requesting processor into the slot corresponding to the fetched counter value in response to determining that the slot corresponding to the fetched counter value indicates not free; and accessing, by the requesting processor, the shared resource in response to determining that the slot corresponding to the fetched counter value indicates free.

15. The system of claim 14, wherein either all of the slots indicate not free or only one of the slots indicates free.

16. The system of claim 14, wherein the operations further comprise:

setting a spin location in the memory for the requesting processor to busy;

continually checking, by the requesting processor, the spin location for the requesting processor while the spin location indicates busy; and accessing, by the requesting processor, the shared resource in response to determining that the spin location for the requesting processor indicates free.

17. The system of claim 16, wherein the operations further comprise:

setting the slot corresponding to the fetched counter value to a busy value in response to determining that the slot indicates free; and setting the slot corresponding to the fetched counter value to a busy value in response to determining that the spin location for the requesting processor indicates free, wherein the slot indicates that the shared resource is not free if the slot indicates the busy value or one of the processor identifiers.

18. The system of claim 16, wherein there is one separate spin location for each of the processors and wherein there is a same number of slots, spin locations and processors.

19. The system of claim 16, wherein each spin location comprises one cache line and wherein a plurality of slot cache lines are used to implement the slots, such that multiple slots are implemented in each of the slot cache lines.

20. The system of claim 14, wherein the operations further comprise:

determining, by a holding processor, comprising one of the processors, to release the shared resource;

determining, by the holding processor, a next counter value sequentially following the counter value of the slot the holding processor processed when requesting the lock;

determining, by the holding processor, whether a next slot, comprising the slot corresponding to the next counter value, has a busy value;

determining a next processor identifier indicated in the next slot in response to determining that the next slot does not have the busy value; and notifying a next processor comprising one of the processors identified by the next processor identifier that the lock is free.

21. A method for managing a lock for a shared resource accessed by a plurality of processors, comprising:

maintaining slots in a memory to implement the lock on the shared resource, wherein the slots correspond to counter values that are consecutively numbered and indicate one of busy and free;

fetching, by a requesting processor comprising one of the processors requesting the lock for the shared resource, a counter value comprising a fetched counter value;

determining whether the slot corresponding to the fetched counter value indicates free;

inserting a processor identifier of the requesting processor into the slot corresponding to the fetched counter value in response to determining that the slot corresponding to the fetched counter value indicates not free; and accessing, by the requesting processor, the shared resource in response to determining that the slot corresponding to the fetched counter value indicates free.

22. The method of claim 21, wherein either all of the slots indicate not free or only one of the slots indicates free.

23. The method of claim 21, further comprising:
setting a spin location in the memory for the requesting processor to busy;
continually checking, by the requesting processor, the spin location for the requesting processor while the spin location indicates busy; and
accessing, by the requesting processor, the shared resource in response to determining that the spin location for the requesting processor indicates free.

24. The method of claim 23, further comprising:
setting the slot corresponding to the fetched counter value to a busy value in response to determining that the slot indicates free; and
setting the slot corresponding to the fetched counter value to a busy value in response to determining that the spin location for the requesting processor indicates free, wherein the slot indicates that the shared resource is not free if the slot indicates the busy value or one of the processor identifiers.

25. The method of claim 23, wherein there is one separate spin location for each of the processors and wherein there is a same number of slots, spin locations and processors.

26. The method of claim 23, wherein each spin location comprises one cache line and wherein a plurality of slot cache lines are used to implement the slots, such that multiple slots are implemented in each of the slot cache lines.

27. The method of claim 21, further comprising:
determining, by a holding processor ready to release the shared resource, to release the shared resource;
determining, by the holding processor, a next counter value sequentially following the counter value of the slot the holding processor processed when requesting the lock;
determining, by the holding processor, whether a next slot, comprising the slot corresponding to the next counter value, has a busy value;
determining a next processor identifier indicated in the next slot in response to determining that the next slot does not have the busy value; and
notifying a next processor comprising one of the processors identified by the next processor identifier that the lock is free.

* * * * *